(No Model.)

W. KIEL.
TRAY

No. 506,120.

Patented Oct. 3, 1893.

Witnesses
S. T. Simpkins
P. H. Larkin

Inventor
William Kiel
by Fenelon B. Brock
Attorney

UNITED STATES PATENT OFFICE.

WILLIAM KIEL, OF BUTLER, NEW JERSEY, ASSIGNOR TO THE BUTLER HARD RUBBER COMPANY, OF NEW YORK.

TRAY.

SPECIFICATION forming part of Letters Patent No. 506,120, dated October 3, 1893.

Application filed June 22, 1893. Serial No. 478,524. (No model.)

*To all whom it may concern:*

Be it known that I, WILLIAM KIEL, a citizen of the United States, residing at Butler, in the county of Morris, State of New Jersey, have invented certain new and useful Improvements in Trays; and I do declare the following to be a full, clear, and exact description of the invention, such as will enable others skilled in the art to which it appertains to make and use the same, reference being had to the letters of reference marked on the drawings which accompany and form a part of this specification.

My invention relates to dishes.

The object of my invention is to provide a rapid draining tray for holding wet articles, or vessels subject to overflow. It is designed more especially for holding beer glasses.

The invention consists in the herein described construction of the tray, the details of which will first be set forth, and the novel features then pointed out and claimed.

Figure 1:
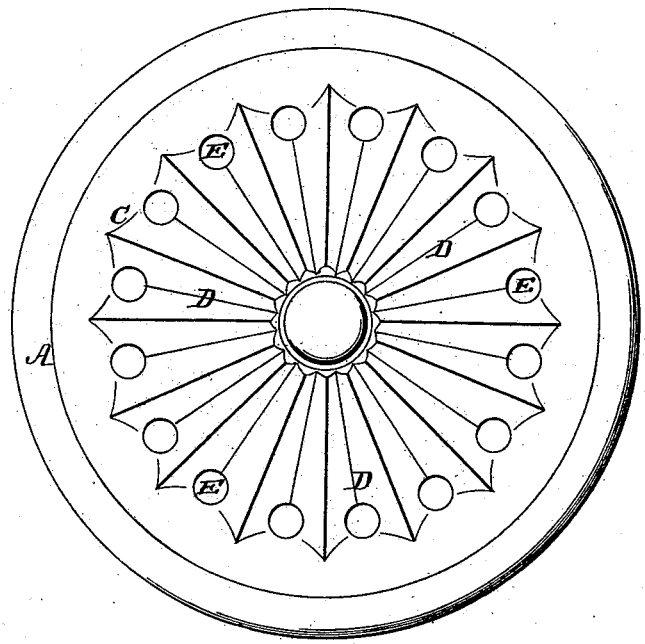
Figure 2:
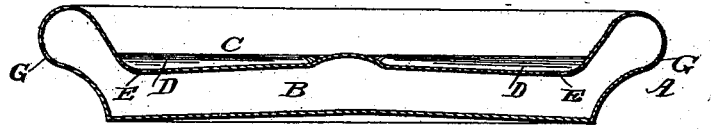

Figure 1 is a plan view of a tray embodying my invention. Fig. 2 is a vertical cross-section.

Referring to the drawings—The tray A is constructed of hard rubber and of a single piece. The tray has a lower fluid-tight compartment B, and a main upper floor or partition C for holding glasses or the like.

D is a series of radial grooves or troughs sloping downwardly from a central point and terminating in a series of drain openings E leading to the lower compartment B. These openings E are preferably arranged along the outer circumference of the tray, for the reason that the overflow from a glass being over and down its outer sides, most of the drippings are directly deposited through the holes E, thereby reducing to a minimum the wetting of the tray. What excess of moisture there may be on the more central portions of the glass bottom is taken up and carried along the radial inclined troughs to the outer openings. With my improved beer tray the drippings are not allowed to stand on the floor C but are quickly deposited in the lower compartment mainly by direct precipitation from the outer rim, and the floor kept dry and tidy. My tray is moreover made from hard rubber in one piece so that there are no joints to become foul from the effects of stale beer. The accumulations are discharged through the holes G, and the tray may be immersed and washed in water without injury.

In making this tray of hard rubber in a single piece it is blown in a mold corresponding to the shape desired, after which the openings E and G are cut or drilled into the same.

I do not claim broadly a tray having a lower compartment, or one with draining grooves made upon the face of the tray.

I claim—

A tray of the character described having a floor provided with a series of openings along its outer circumference, a series of inclined passages leading thereto, a lower compartment and a series of discharge openings from the lower compartment.

In testimony whereof I affix my signature in the presence of two witnesses.

WILLIAM KIEL.

Witnesses:
 GEO. J. FRITZ,
 JOS. F. MCLEAN.